(12) United States Patent
Lam et al.

(10) Patent No.: US 6,505,382 B1
(45) Date of Patent: Jan. 14, 2003

(54) HINGE APPARATUS WITH CAM MECHANISM

(75) Inventors: Lawrence Lam, San Jose, CA (US); Chris J. Stringer, Pacifica, CA (US); Roy Riccomini, Saratoga, CA (US); Sung H. Kim, Palo Alto, CA (US); Mark Sorensen, Redwood City, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/387,276

(22) Filed: Aug. 31, 1999

Related U.S. Application Data

(60) Provisional application No. 60/134,121, filed on May 14, 1999.

(51) Int. Cl.[7] .............................................. E21B 33/06
(52) U.S. Cl. ........................ 16/325; 16/335; 16/306; 16/304; 16/302; 361/680; 361/681
(58) Field of Search ......................... 16/325, 335, 28.4, 16/285, 304, 306, 302; 361/680, 681, 682, 683

(56) References Cited

U.S. PATENT DOCUMENTS

| 4,584,639 | A | | 4/1986 | Hardy |
| 4,692,838 | A | | 9/1987 | Merchant |
| 4,897,873 | A | * | 1/1990 | Beutler ........................ 16/325 |
| 5,165,145 | A | * | 11/1992 | Sherman ...................... 16/340 |
| 5,553,305 | A | | 9/1996 | Gregor et al. |
| 5,555,157 | A | * | 9/1996 | Moller et al. ............ 312/223.2 |
| 5,619,650 | A | | 4/1997 | Bach et al. |
| 5,699,698 | A | * | 12/1997 | Geyer ........................ 403/320 |
| 5,789,828 | A | | 8/1998 | Tremaine et al. |
| 5,793,978 | A | | 8/1998 | Fowler |
| 5,909,540 | A | | 6/1999 | Carter et al. |
| 5,915,094 | A | | 6/1999 | Kouloheris et al. |
| 5,918,229 | A | | 6/1999 | Davis et al. |
| 5,961,584 | A | | 10/1999 | Wolf |
| 6,108,868 | A | * | 8/2000 | Lin ............................. 16/340 |
| 6,148,480 | A | * | 11/2000 | Cooke ........................ 16/304 |
| 6,252,767 | B1 | | 6/2001 | Carlson |
| 6,256,129 | B1 | | 7/2001 | Kim et al. |

* cited by examiner

Primary Examiner—Anthony Knight
Assistant Examiner—Enoch E Peavey
(74) Attorney, Agent, or Firm—Beyer Weaver & Thomas, LLP

(57) ABSTRACT

An improved hinge mechanism for use with a portable computing device is disclosed. According to one aspect, a hinge mechanism includes a first assembly with a pivot connection, a cam follower, and a second assembly. The cam follower is used to produce a cam action. The second assembly includes a cam. The cam follower cooperates with the cam to produce a moment about an axis associated with the latching hinge mechanism. The cam follower and the cam also cooperate to effectively latch the first assembly with respect to the second assembly when the cam is in a first position. According to another aspect, a display screen of the portable computing device can be rotateably-hinged to a base such that the display screen is set back from the base when the display screen is opened.

43 Claims, 9 Drawing Sheets

HINGE APPARATUS WITH CAM MECHANISM

CROSS-REFERENCE TO RELATED APPLICATION

This application claims the benefit of U.S. Provisional Application No. 60/134,121, filed May 14, 1999, and entitled "HINGE APPARATUS WITH CAM MECHANISM", the content of which is hereby incorporated by reference.

BACKGROUND OF THE INVENTION

1. Field of the Invention

The present invention relates generally to hinge mechanisms. More particularly, the present invention relates to a hinge mechanism which is suitable for use in a portable computing device.

2. Description of the Related Art

The use of personal computers is widespread and is rapidly becoming even more prevalent. As advances in technology enable the size of personal computers to decrease, the use of portable computers such as notebook, or laptop, computers and notepad computers is increasing. The portability of notebook computers and notepad computers enables a user to keep his or her computer readily accessible such that computing resources are effectively always at hand.

Many portable computers are configured such that a display screen of the computer pivots, or rotates, with respect to the base of the computer. FIG. 1 is a diagrammatic representation of a portable computer or, more specifically, a notebook computer 102. Notebook computer 102 includes a rotating, or hinging, section 106 and a fixed section 110. Rotating section 106 typically includes a display screen 114, while fixed section 110 often includes input/output devices such as a keyboard 118 and a track pad 119, in addition to buttons 121 which are associated with track pad 119. Fixed section 110 also houses a central processing unit and other computer hardware (not shown).

Hinges 122 are used to allow rotating section 106 to rotate with respect to fixed section 110, and are effectively positioned to couple a top surface of fixed section 110 to a front surface of rotating section 106. Typically, hinges 122 hold a front edge of rotating section 106 in close proximity to a top edge of fixed section 110. As shown, rotating section 106 is "open" at roughly a 90 degree angle measured with respect to fixed section 110. The configuration of hinges 122 may be such that rotating section 106 is constrained to rotation within a certain range. Once the angle between fixed section 110 and rotating section 106 is as desired, then rotating section 106 may at least be temporarily fixed with respect to fixed section 110.

In order for rotating section 106 to be able to rotate and to hold a desired position at a given angle of rotation, hinges 122 typically include, or are associated with, brakes. The brakes, which are typically either spring-based or gear-based, are used to effectively "lock" hinges 122 in place. Hinges 122 are locked into place to prevent rotation when no torque, or rotational force, is applied to hinges 122 or, more generally, to either rotating section 106 or fixed section 110.

When notebook computer 102 is closed, i.e., when rotating section 106 is flush with fixed section 110 such that display screen 114 is effectively adjacent keyboard 118, notebook computer 102 also includes a latching mechanism 126 that holds notebook computer 102 in a closed position. Latching mechanism 126 includes an activator 126a, a linker 126b, and a receiver 126c. Linker 126b engages receiver 126c when notebook computer 102 is closed such that rotating section 106 is locked with respect to fixed section 110. Activator 126a is coupled to linker 126b, and is used to disengage linker 126b from receiver 126c when rotating section 106 is to be unlocked from fixed section 110. In some cases, a receptacle, rather than a linker, may be coupled to an activator. It should be appreciated that some notebook computers may include more than one linker and more than one receptacle.

Latching mechanism 126 is generally required by notebook computer 102 in order to enhance the portability of notebook computer 102. Without latching mechanism 126, it would be difficult to hold rotating section 106 closed against fixed section 110, as rotating section 106 would generally be free to rotate into an open position with respect to fixed section 110. If rotating section 106 were to open with respect to fixed section 110 at an inopportune time, e.g., when notebook computer 102 is packed for transport, damage to notebook computer 102 may occur. For example, display screen 114 or keyboard 118 may be damaged from contact with relatively heavy objects. The latching mechanism also makes carrying of the notebook computer significantly less difficult by keeping the rotating section 106 fixed with respect to the fixed section 110.

The construction and, additionally, the positioning of latching mechanism 126 may be relatively complex, as linker 126b must be arranged to be received and engaged within receptacle 126c. Hence, the tolerances associated with the manufacture and positioning of linker 126b and receiver 126c must enable linker 126b and receiver 126c to interface. The positioning of linker 126b with respect to receiver 125c is crucial to ensure that notebook computer 102 may be properly closed and locked. As will be appreciated by those skilled in the art, due to tolerances stacking up, the fact that rotating section 106, on which linker 126b is mounted, is coupled by hinges 122 to fixed section 110, on which receiver 126c is mounted, there is little room for error in the positioning of linker 126b and receiver 126c. Accordingly, the manufacturer of the notebook computer 102 is difficult and time-consuming.

Reducing the time associated with the manufacture of a notebook computer increases the throughput of an overall manufacturing process. Both manufacturing time and cost may be reduced by increasing tolerances associated with the design of the notebook computer, eliminating parts from the notebook computer, and integrating functionality from eliminated parts into other parts. By way of example, eliminating a dedicated latching mechanism for effectively locking a notebook computer in a closed position would generally reduce the time associated with the process of manufacturing a notebook computer.

Therefore, what is desired is a readily manufacturable apparatus which allows a rotating section of a notebook computer to be locked with respect to a fixed section of a notebook computer.

SUMMARY OF THE INVENTION

The present invention relates to an improved hinge mechanism for use with a portable computing device. One aspect of the present invention relates to a hinge apparatus which provides a cam action to obtain latching functionality. Another aspect of the present invention pertains to a display screen of a portable computing device that is rotateably-hinged to a base such that the display screen is set back from the base when the display screen is opened.

In one embodiment, a hinge mechanism includes a first assembly with a connection pivot and a cam follower, and a second assembly with a cam. The first and second assemblies are rotationally coupled to the connection pivot, and the cam follower cooperates with the cam to produce a moment about the connection pivot to hold the first assembly with respect to the second assembly when the second assembly is in a first position (i.e., closed position) with respect to the first assembly. A hinge assembly which includes such latching, or locking, functionality (by holding the first assembly with respect to the second assembly) generally eliminates the need for a separate latching mechanism when the hinge assembly is used with a portable computing apparatus.

In still another embodiment, a computing apparatus includes a first housing which contains a processor, a display screen, and a first hinge mechanism that couples the display screen to the first housing. The display screen rotates with respect to the first housing, and the first hinge mechanism is capable of holding the display screen substantially against the first housing when the display screen is positioned such that a front surface of the display screen is substantially parallel to a top surface of the first housing. In one embodiment, the computing arrangement includes a handle that is coupled to the first hinge mechanism.

In yet another embodiment, a computing apparatus a base, a display screen, and a hinge arranged to rotateably couple the display screen to the base. The display screen is arranged to rotate with respect to the base, and the display screen has an open position and a closed position with respect to the base. When the display screen is in the open position, a bottom edge of the display screen is set back a distance from a back surface of the base.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE INVENTION

Portable computing devices, e.g., notebook computers, typically include a mechanical latch which is arranged to lock a lid of the device against a base of the device for storage. The construction and the positioning of a latch may be complicated, as a section of the latch that is coupled to the lid must be positioned to engage a section of the latch that is coupled to the base when the lid is to be locked to the base. That is, the tolerances associated with the manufacture and the positioning of parts of the latch must enable the parts to interface. Since tolerances associated with coupling a lid to a base using hinges add to the tolerances associated with a latch, there is generally very little room for error in the positioning of the parts of the latch. Therefore, as the positioning of parts of a latch is often complex, the positioning of the parts is also time-consuming and expensive. In addition, although effective in locking the lid to the base, such latches also make use (i.e., opening and closing) of the portable computing device more difficult for users.

According to one aspect, the invention relates to a hinge which includes the ability to serve as a latch and thus allows a dedicated latch mechanism to be eliminated from a portable computing device. By using the hinge, a user of the portable computing device need not be concerned with having to manipulate a dedicated latch mechanism. The inventive hinge is also relatively easy to manufacture. Such a hinge is arranged such that when the angle between a lid of a portable computing device and a base of the portable computing device is in a particular range, no torque is required to essentially "close" the lid onto the base. When the lid is closed with respect to the base, the lid is effectively latched to the base, and will not "open" without the application of a torque.

According to another aspect, the invention relates to a portable computing device that has a display screen rotateably-hinged to a base. When the display screen is opened, such as for use by a user, the display screen is set back from the base. The resulting portable computing device thus presents the user with a open and spacious feel.

Figure 2:
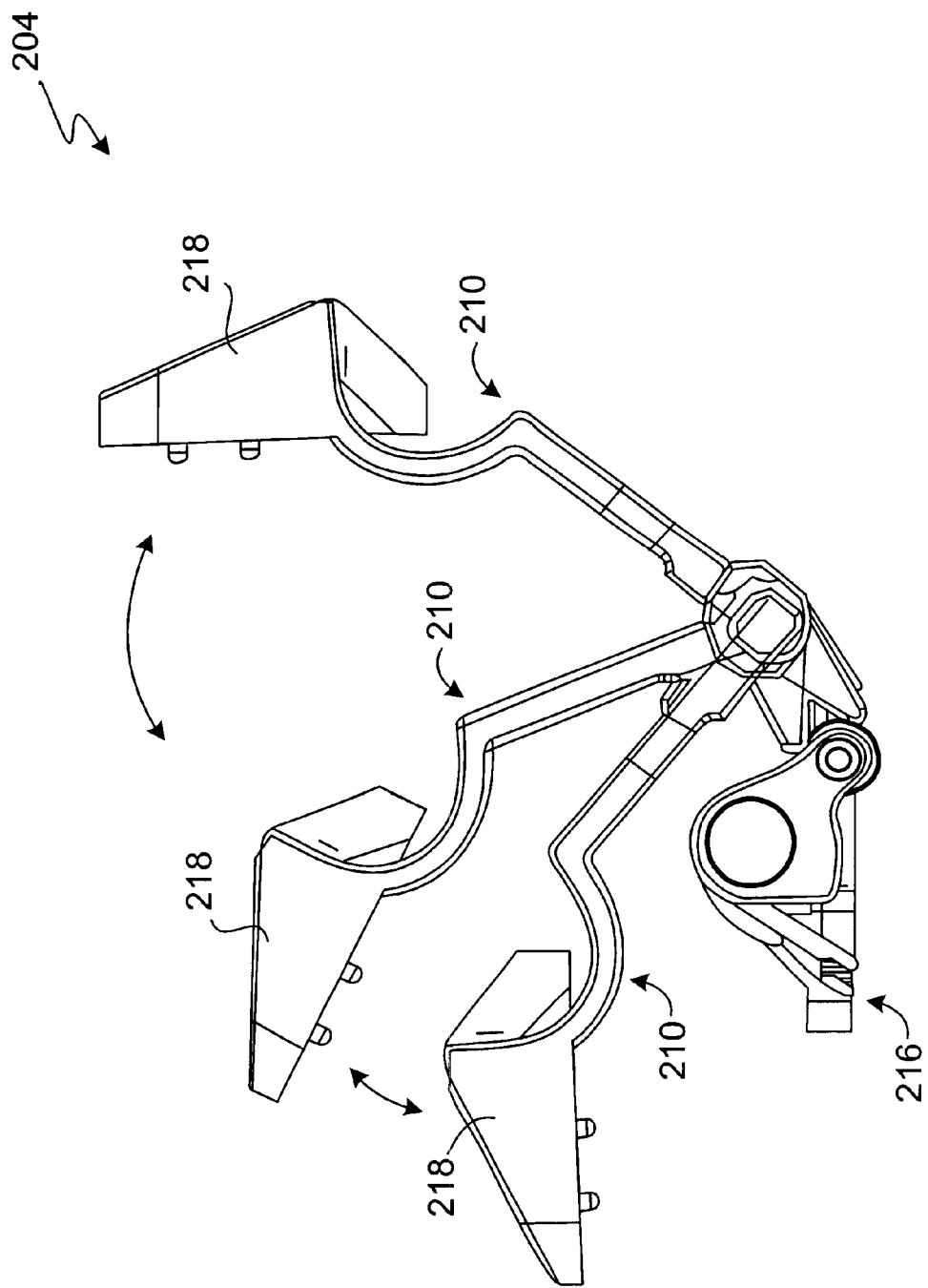
FIG. 2 is a diagrammatic side-view representation of positions of a hinging mechanism which is suitable for biasing a display section of a portable computing apparatus against a base section of the portable computing apparatus in accordance with an embodiment of the present invention.

With reference to FIG. 2, a hinge mechanism will be described in accordance with an embodiment of the present invention. FIG. 2 shows three positions of a lid hinge assembly with respect to a base hinge assembly. As will be appreciated by those skilled in the art, a portable computing system typically includes two hinges which rotateably couple a lid of the computing system to a base of the computing system. The hinges are often positioned such that one hinge is placed to the right of the center of the computing system, while the second hinge is placed to the left of the center of the computing system. A hinge mechanism 204, as shown, is arranged for use to the right of the center of the computing system, although it should be appreciated that hinge mechanism 204 may be modified for use to the left of the center of the computing system.

Hinge mechanism 204 includes a lid hinge assembly 210 that is rotateably coupled to a base hinge assembly 216. The coupling enables lid hinge assembly 210 to rotate with respect to base hinge assembly 216 while base hinge assembly 216 remains in a substantially fixed position.

A bracket 218, or a frame, of lid hinge assembly 210 is arranged to be attached to the lid, e.g., the display, of a portable computing apparatus such as a notebook computer. The attachment may occur through the use of fasteners, e.g., screws. Similarly, base hinge assembly 216 is arranged to be fastened, or otherwise attached, to the base of a notebook computer.

In general, the various parts included with hinge mechanism 204 may be formed from a variety of different materials. Suitable materials may include, but are not limited to, plastics, aluminum, and steel. Further, the parts may be manufactured using substantially any suitable processes including, by way of example, milling processes, molding processes, and extrusion processes.

Figure 3:
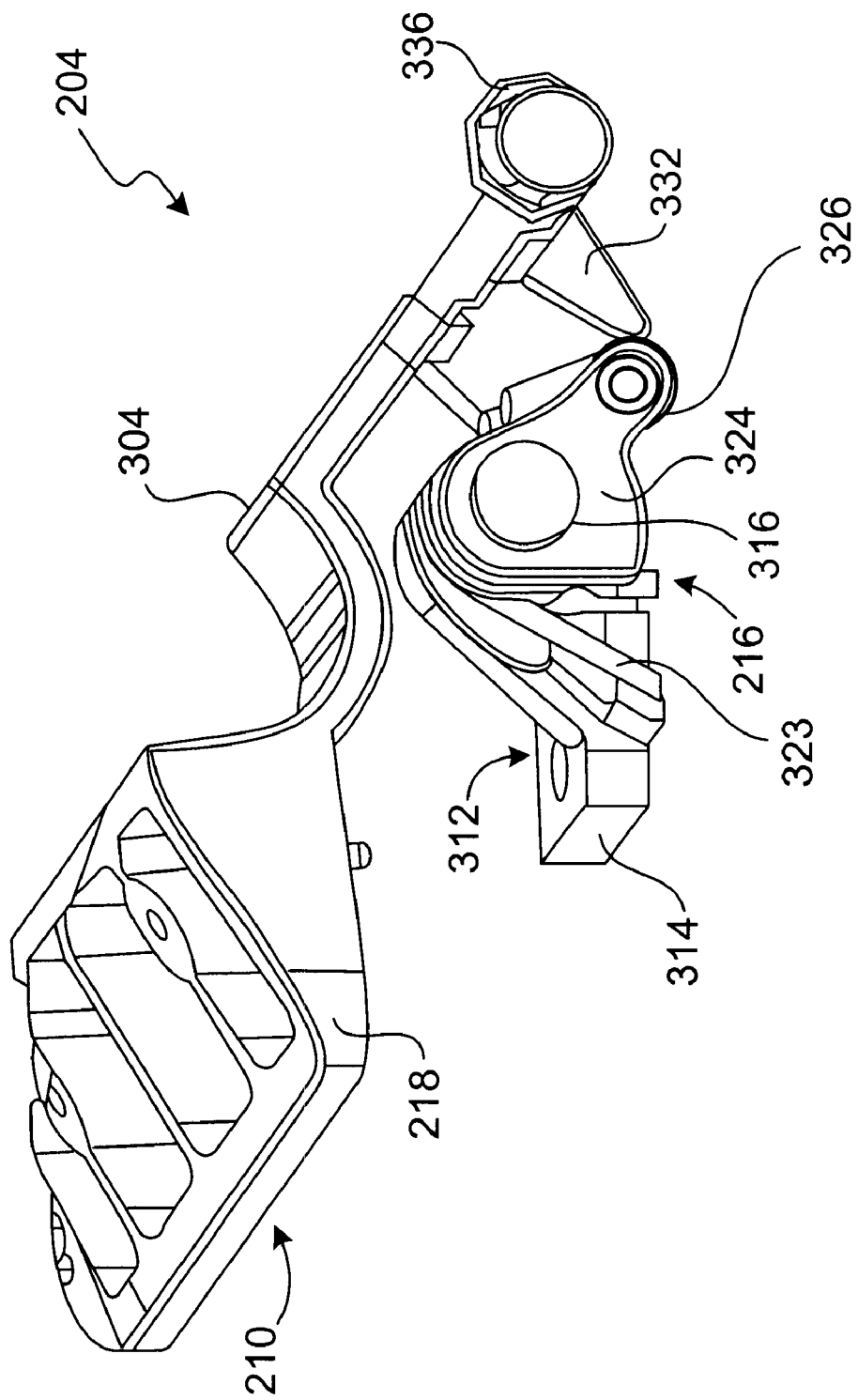
FIG. 3 is a diagrammatic perspective representation of a hinging mechanism in a closed position in accordance with an embodiment of the present invention.

FIG. 3 is a diagrammatic perspective representation of a hinging mechanism, i.e., hinging mechanism 204 of FIG. 2, in accordance with an embodiment of the present invention. Hinging mechanism 204 is shown in a "closed" or, more specifically, a locked position. In other words, as shown, hinging mechanism 204 is arranged such that a lid of a notebook computer, which is coupled to lid hinge assembly 210, is substantially closed against the base of the notebook computer, which is coupled to base hinge assembly 216. A closed position, in one embodiment, implies that the surface of a display screen of the notebook computer is held substantially flush against the surface of a keyboard of the base of the notebook computer.

Base hinge assembly 216, which will be described below with reference to FIGS. 5 and 6a, includes a hinge base or base hinge piece 312 which is mounted to the base of a notebook computer. In one embodiment, base plate 314 of base hinge piece 312 is fastened to a base of a notebook computer. Base hinge piece 312 also includes a shaft 316 around which a cam arm 324 may be rotateably positioned.

Cam arm 324 supports a cam follower 326 which cooperates with a cam 332. Cam arm 324 will be discussed below with respect to FIGS. 5 and 6b. Cam 332, which is a part of lid hinge assembly 210, is mounted with respect to lid hinge assembly 210 such that cam 332 is essentially constrained to move with a hinge connection 336, as will be described in more detail below with respect to FIGS. 5 and 6c. Cam 332 is in contact with cam follower 326 of cam arm 324 when an angle of opening associated with lid hinge assembly 210 is in a particular range. In a first part of the particular range, the cam 332 contacts the cam follower 326 and an external torque is needed to be induced to rotate the lid hinge assembly 210 to further reduce the angle of opening. Here, if the angle of opening is further reduced, the cam 332 passes over the cam follower 326. If the angle of opening continues to be reduced by the application of the external torque, the cam 332 will have passed over the cam follower 326 and once then occurs the cam arm 324 and the cam follower 326 produce a torque (or moment) on the lid hinge assembly 210 to cause the angle of opening to further be reduced to a closed position. Hence, once the lid hinge assembly 210 is closed to a certain extent, then further closed with an external torque, and then "pulled" into the closed position without any external torque. The cam follower 326 begins to push against the cam 332 to put the lid hinge assembly 210 in the closed position when the angle of opening is in a particular range (e.g., typically about 5–10 degrees from the closed position). The closed position can also be considered a locked position.

Although there is no latch mechanism, the torque applied by the cam arm 324 and the cam follower 326 acts to effectively latch or lock the lid hinge assembly 210 in the closed position. This torque also generally prevents accidental unlocking from occurring. When hinging mechanism 204 is in a closed position, cam 332 of lid hinge assembly 210 is positioned against a cam follower 326 such that cam 332 may not move with respect to cam follower 326 without the application of an appropriate torque to either bracket 218 or an arm 304 of lid hinge assembly 210. As a result, no latch mechanism is needed, and the lid hinge assembly 210 is able to be again opened by that application of an external torque that exceeds the torque applied by the cam arm 324 and the cam follower 326. The external torque needed to open the lid hinge assembly 210 from the closed position exceeds a predetermined level which is determined dependent on the weight of the lid. In one implementation, the external torque is on the order of 6–9 in.lbs. in order to open the lid hinge assembly 210.

One end of a cam spring 323 is attached to base hinge piece 312, while another end of cam spring 323 is attached to cam arm 324 to further prevent locked hinge mechanism 204 from unlocking (i.e., opening) without the application of an appropriate torque. In the described embodiment, cam spring 323 is a pre-loaded, coiled, constant force spring that is positioned around shaft 316. When hinge mechanism 204 is in a locked position, cam spring 323 is effectively arranged to maintain the locked position (i.e., closed position) until an appropriate hinge torque is applied to unlock hinge mechanism 204.

Hinge connection 336, e.g., a torque master hinge, of lid hinge assembly 210 is coupled to base hinge assembly 216 such that hinge connection 336 may rotate about a secondary axis of hinge mechanism 204. Hinge connection 336 rotates about the secondary axis of hinge mechanism 204 such that the opening of lid hinge assembly 210 with respect to base hinge assembly 216 may be controlled. That is, a hinge torque associated with hinge connection 336 effectively controls the angle at which lid hinge assembly 210 is opened, i.e., the angle of opening, as measure with respect to base hinge assembly 216. Hinge connection 336 is also arranged to substantially maintain the angle of opening when the angle of opening is greater than a predetermined angle. The predetermined angle may vary widely depending upon the requirements of a particular design. By way of example, the predetermined angle may be approximately ten degrees as measured between the bottom surface of base hinge assembly 216 and a bottom surface of frame 218, i.e., the surface of frame 218 which faces base hinge assembly 216 when the angle of opening is below approximately ten degrees.

In one embodiment, when the angle of opening is less than approximately five to approximately ten degrees, cam spring 323, cam arm 324, cam follower 326, and cam 332 are arranged to bias lid hinge assembly 210 closed with respect to base hinge assembly 216. When lid hinge assembly 210 is biased to a closed position, the hinge torque, as discussed above, is approximately zero.

Hinge mechanism 204 is arranged such that hinge connection 336, which is associated with a pivot point of lid hinge assembly 210, may be located towards the back of a notebook computer of which hinge mechanism 204 is a part. In one embodiment, the axis of rotation associated with hinge connection 336 is slightly lowered as compared to the axis of rotation associated with shaft 316. The positioning of hinge connection 336 (and, hence, the pivot point or axis which passes axially through hinge connection 336) at the back of a notebook computer and lowered below the top surface of the fixed section (e.g., base) of the notebook computer, enables a lid (display screen) coupled to frame 218 to open away from a base of the notebook computer. The distance by which the lid is opened away (or set back) from the base of the notebook computer is determined by the length of the lid hinge assembly 210 from the frame 218 to the hinge connection 336. Allowing a screen to open away from a base such that there is a substantial clearance between the bottom of the screen and the base and thus provides a user with a more spacious impression of the notebook computer as the screen is set back from the base. This aspect of the invention is discussed further below with reference to FIGS. 8a and 8b.

When hinge mechanism 204 is in a closed position, cam 332 is in contact with cam follower 326. However, when hinge mechanism 204 is in an open position such that the angle of opening is greater than the range of approximately 5–15 degrees, cam 332 is not in contact with cam follower 326.

Figure 4:
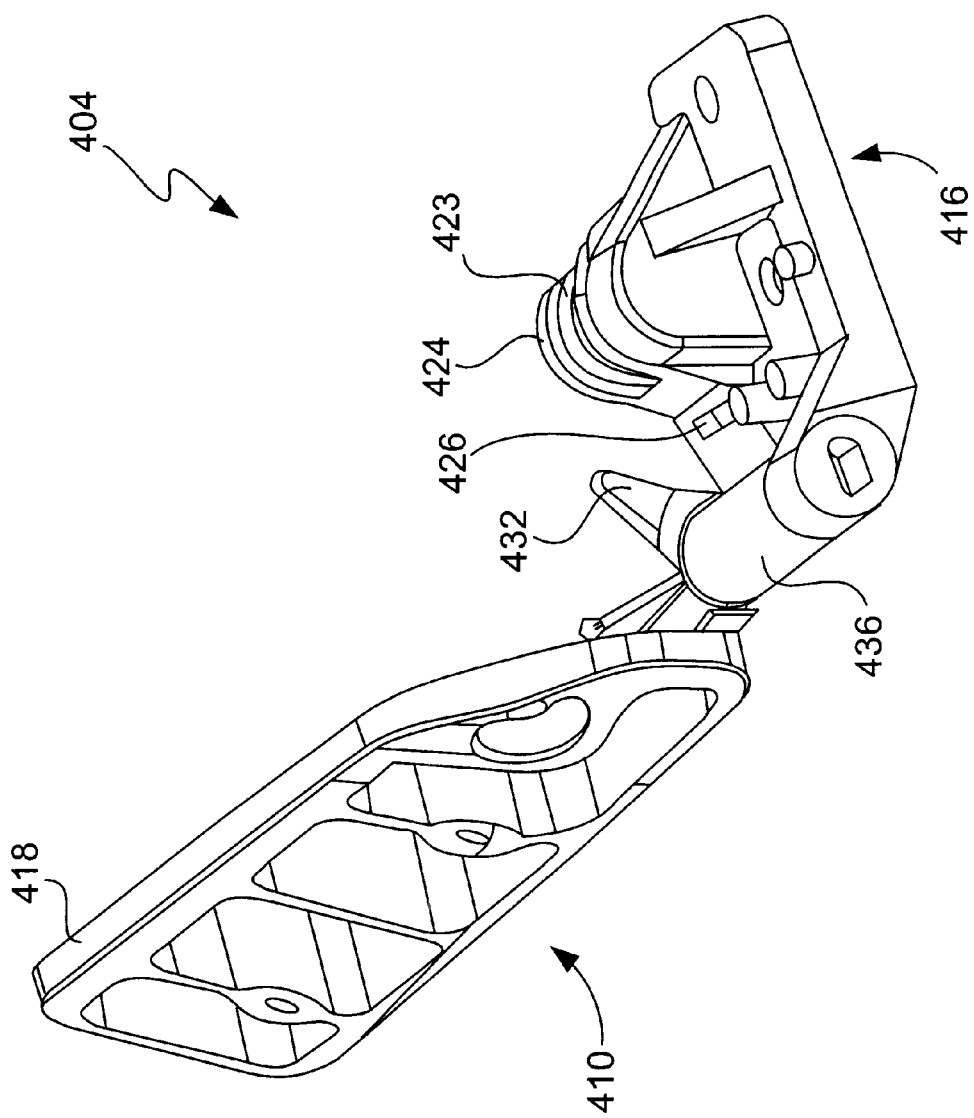
FIG. 4 is a diagrammatic perspective representation of a hinging mechanism in an open position in accordance with an embodiment of the present invention.

FIG. 4 is a diagrammatic perspective representation of a hinge mechanism in an open configuration in accordance with an embodiment of the present invention. A hinge mechanism 404 is substantially the same as hinge mechanism 204 of FIG. 2. However, while hinge mechanism 204 is adapted for use as a "right-side" hinge mechanism with respect to a notebook computer, hinge mechanism 404 is adapted for use as a "left-side" hinge mechanism. In other words, hinge mechanism 404 may be considered to be a "mirror image" of hinge mechanism 204.

The rotation of hinge mechanism 404 occurs as a hinge connection 436 rotates around a hinge band (or a torque master hinge rotates around or a torque master band) (not shown). Friction between hinge connection 436 and the hinge band prevents hinge connection 436 from slipping significantly when no torque is applied to either a lid hinge assembly 410 or a base hinge assembly 416. In other words, friction allows a lid coupled to a frame 418 to remain open to a desired angle.

As shown in FIG. 4, when hinge mechanism 404 is in an open position, e.g., with an angle of opening of approximately 90 degrees, a cam 432 typically does not come into contact with a cam follower 426. Although the maximum angle of opening for a hinge mechanism 404 may be widely varied, in one embodiment, the maximum angle of opening is approximately in the range of 160–180 degrees.

Cam 432 moves closer to contacting cam follower 426, and eventually contacts cam follower 426 as the angle of opening is decreased, thereby creating a moment about a hinge axis. Once the angle of opening is decreased to below approximately ten degrees, cam 432 and cam follower 426 cooperate with a cam spring 423 and a cam arm 424, as mentioned above with respect to FIG. 3, to close and to lock hinge mechanism 404.

Figure 5:
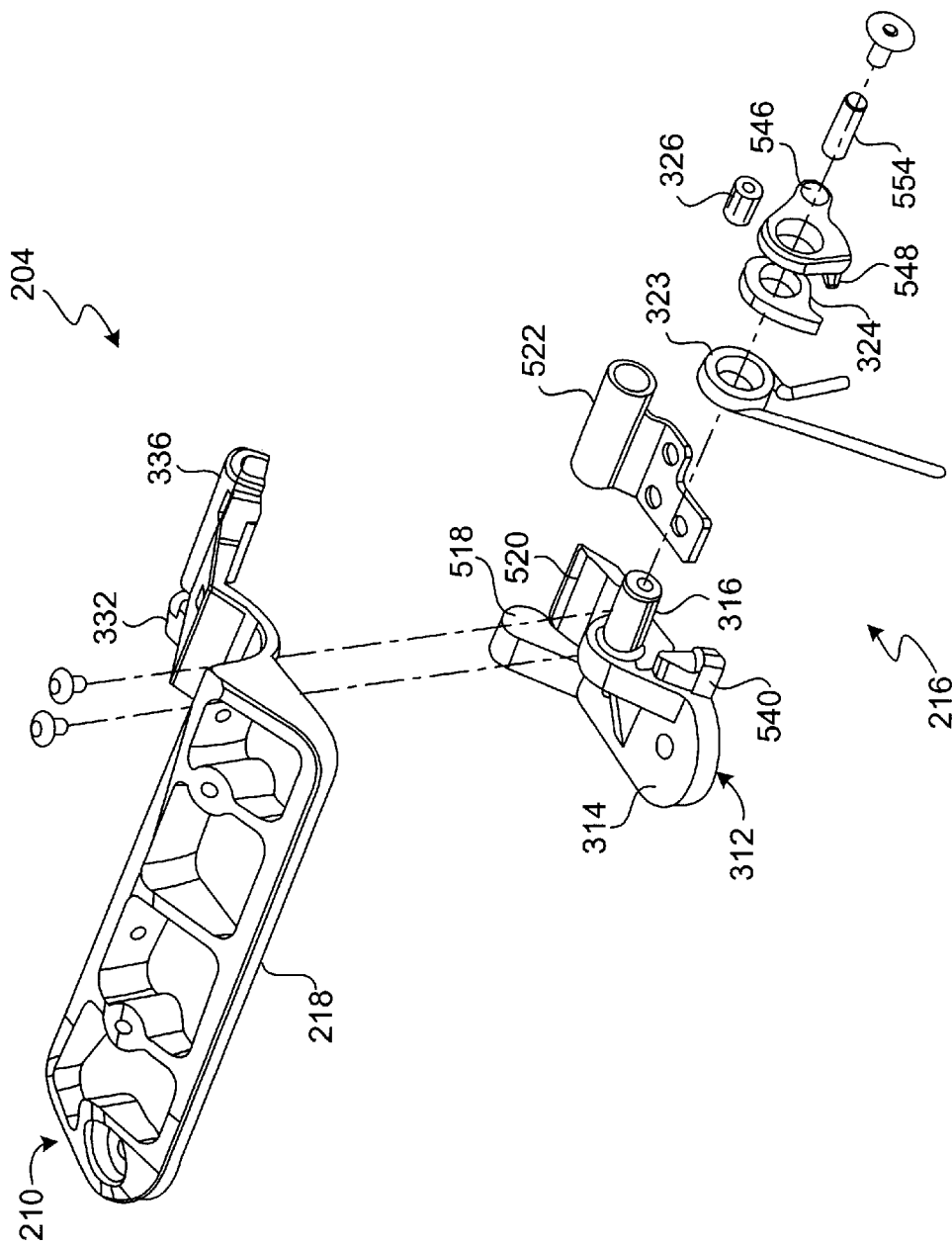
FIG. 5 is a diagrammatic exploded representation of the pieces associated with a hinging mechanism in accordance with an embodiment of the present invention.
Figure 6A:
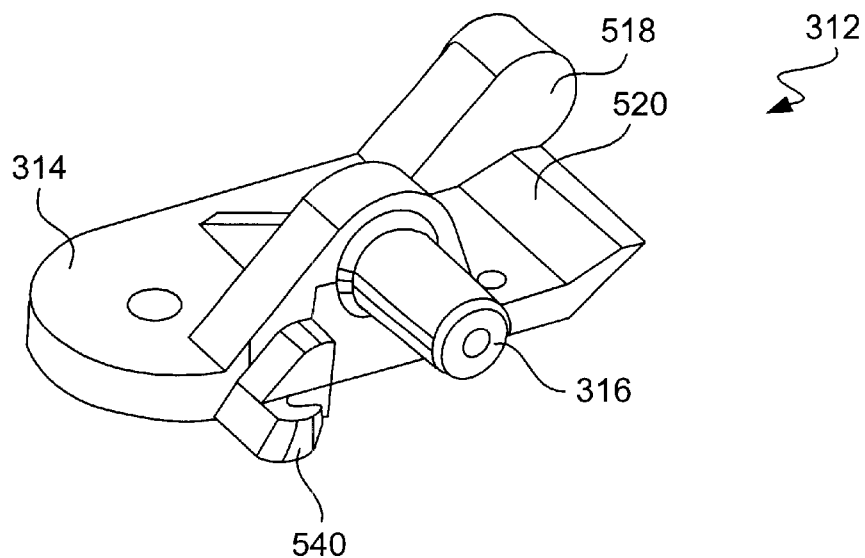
FIG. 6a is a diagrammatic representation of a hinge base in accordance with an embodiment of the present invention.

Referring next to FIG. 5, the individual parts of hinge mechanism 204 of FIGS. 2 and 3 will be described in accordance with an embodiment of the present invention. Base hinge piece 312, which is shown in more detail in FIG. 6a, includes a base plate 314 which is arranged to be secured to a base portion of a notebook computer, e.g., through a screw. A cantilever shaft 316 protrudes from base hinge piece 312, and is arranged to extend through a cam arm 324 such that cam arm 324 may rotate around cantilever shaft 316. An axis which runs axially through cantilever shaft 316 defines an axis of rotation for cam arm 324, which may be formed from a material such as aluminum.

Figure 7:
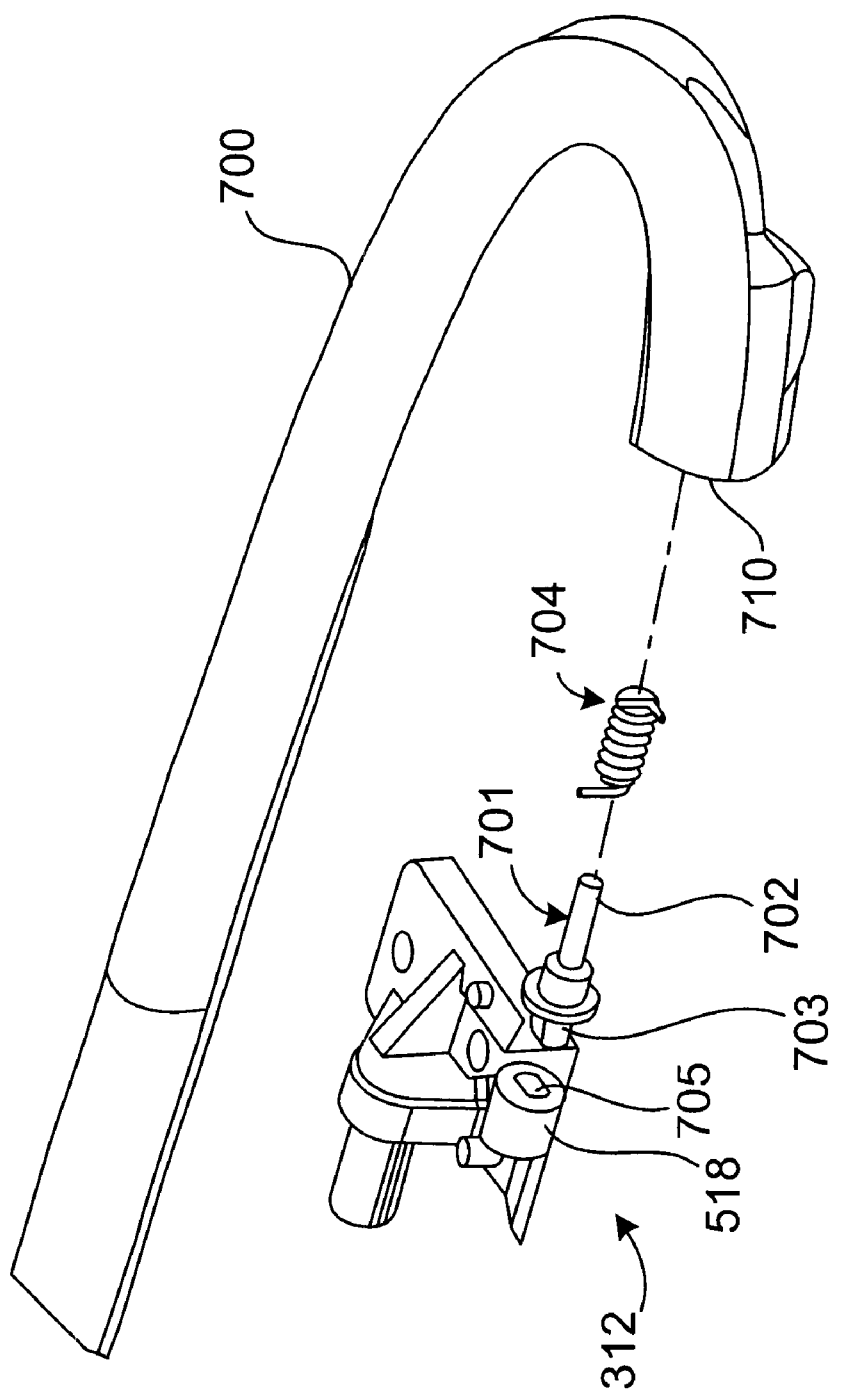
FIG. 7 is a diagrammatic representation of a portion of a handle which is suitable for attaching to a hinge base of a hinge mechanism in accordance with another embodiment of the present invention.

Base hinge piece 312, or the hinge base, further includes a coupler 518 which, in the described embodiment, is arranged to be coupled to a handle, as will be discussed below with reference to FIG. 7. Coupler 518 defines an opening (not shown) into which a linkage associated with a handle may be press-fit.

An extension 520, which extends from base plate 514, is arranged to facilitate the coupling of band 522 to base plate 314. Band 522 provides a surface over which hinge connection 336 may be rotateably mounted. Although band 522 may be formed from any suitable material, in one embodiment, band 522 may be formed from a metal such as steel and titanium.

A protrusion 540 which is located proximally to shaft 316 of base hinge piece 312 engages an end of a preloaded cam spring 323 when cam spring 323 is coiled over shaft 316. Although a first end of cam spring 323, which may be formed from coiled steel, may be attached to protrusion 540 in a variety of different methods, in one embodiment, cam spring 323 is held against the protrusion 540 through a hook provided in the protrusion 540 and a spring-force.

Figure 6B:
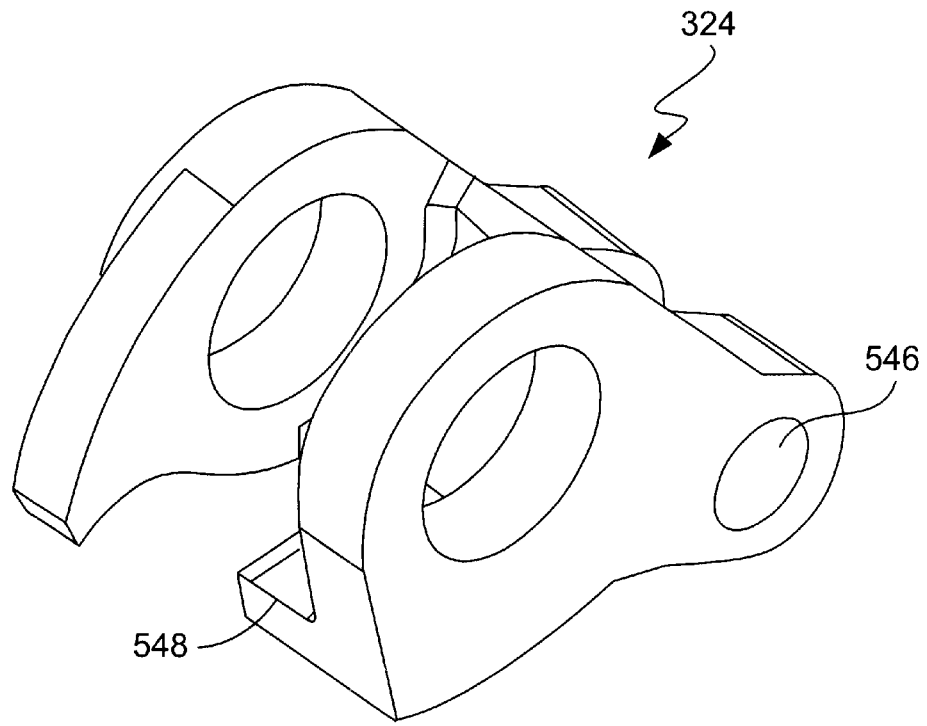
FIG. 6b is a diagrammatic representation of a cam arm in accordance with an embodiment of the present invention.

Cam arm 324, which is shown in more detail in FIG. 6b, includes a protrusion 548 which is arranged to engage a second end of cam spring 323. As cam arm 524 is rotated, cam spring 323 may either extend or retract, depending upon the direction in which cam arm 524 rotates. A cam follower 326 is sized to be placed at least partially within cam arm 324 such that it may be held within cam arm 324 by a cam pin 544 inserted through a cam arm opening 546. In one embodiment, the cam follower 326 is a roller that can rotate about the cam pin 544 (such as when being contacted by the cam 332). Cam pin 544 may take on a variety of different configurations. Such configurations include, but are not limited to, a flat-headed pin and a Tinnerman retainer, as will be appreciated by those skilled in the art.

Lid hinge assembly 210 includes a frame 218 which is typically attached to a lid of a notebook computer, a hinge connection 336, and a cam 332. While hinge connection 336, which may be formed from a material such as plastic, is arranged to rotate over band 522, cam 332, which may be formed from a material such as steel, is arranged to cooperate with cam follower 326, cam arm 324, and cam spring 323 to effectively latch, e.g., lock, lid hinge assembly 210 with respect to base hinge assembly 216.

Figure 6C:
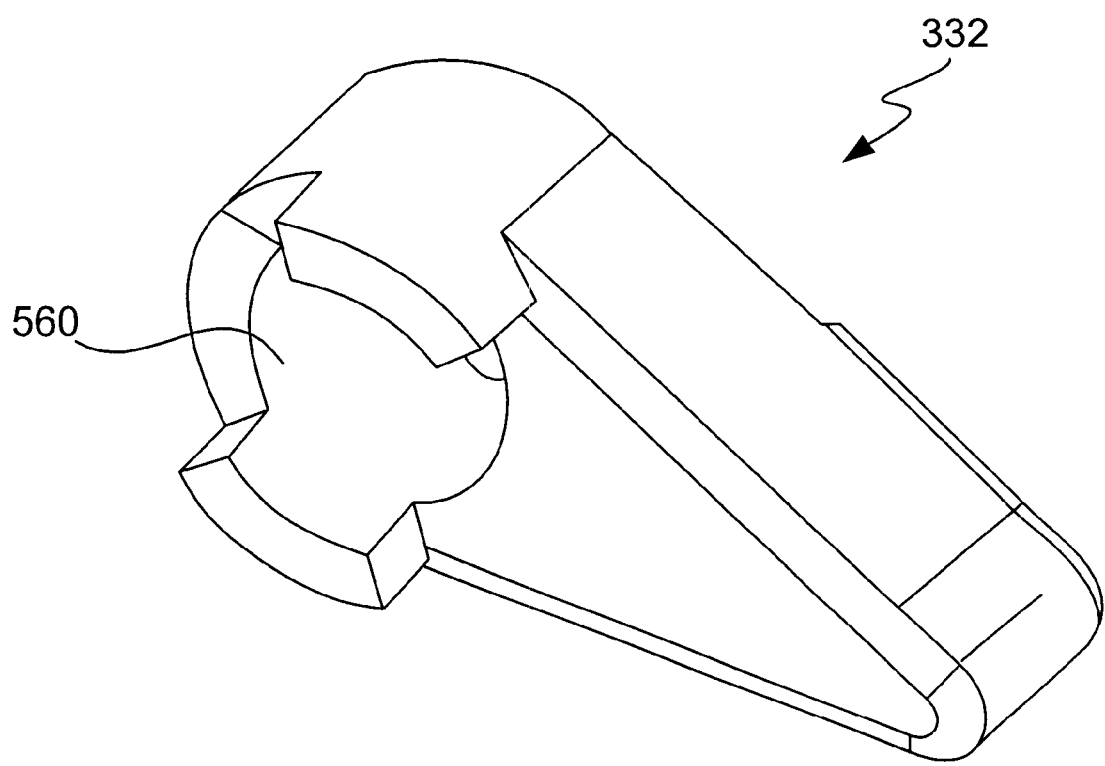
FIG. 6c is a diagrammatic representation of a cam in accordance with an embodiment of the present invention.

In the described embodiment, cam 332 is formed from steel, and includes an opening 560 through which a shaft (not shown) associated with lid hinge assembly 210 may pass. Such a shaft may include an extension which effectively constrains cam 332 from becoming decoupled from lid hinge assembly 210. Alternatively, as shown in FIG. 6c, opening 560 may be sized to fit over a portion of hinge connection 336.

As mentioned above with respect to FIG. 5, a base hinge assembly may include a coupler 518 that is adapted for coupling to a handle. FIG. 7 is a diagrammatic representation of a portion of a handle which is suitable for attaching to a base hinge assembly in accordance with a second embodiment of the present invention. A portion of a handle 700, which is arranged to extend effectively between two hinge assemblies associated with a notebook computer, is rotateably coupled to a base hinge plate 312, which was described above with respect to FIGS. 5 and 6a. Handle 700 may be used to facilitate the transport of a notebook computer. In the described embodiment, an extension 518 of base hinge plate 312 is coupled, e.g., attached, to handle 700 through a pin 701.

A first end 703 of pin 701 may be press-fit into an opening 705 in extension 518. A second end 702 of pin 701, which may be a shaft, is sized to pass through a compression spring 704 and into an opening (not shown) at a first end 710 of handle 700. Spring 704 is used to bias the handle 700 back to its "down" position after being pulled "up" for use.

In general, although handle 700 has been shown as having a substantially circular cross-section, the shape of handle 700 may vary. The substantially circular cross-section enables handle 700 to be readily gripped. Other cross-sectional shapes which may be relatively easy to grip include, but are not limited to, an ovular cross-sectional shape and polygonal cross-sectional shape. In addition, it should be appreciated that handle 700 may be formed from a variety of different materials. The materials are generally strong, durable, and relatively lightweight. By way of example, a rubber material may be used to form handle 700.

Figure 1:
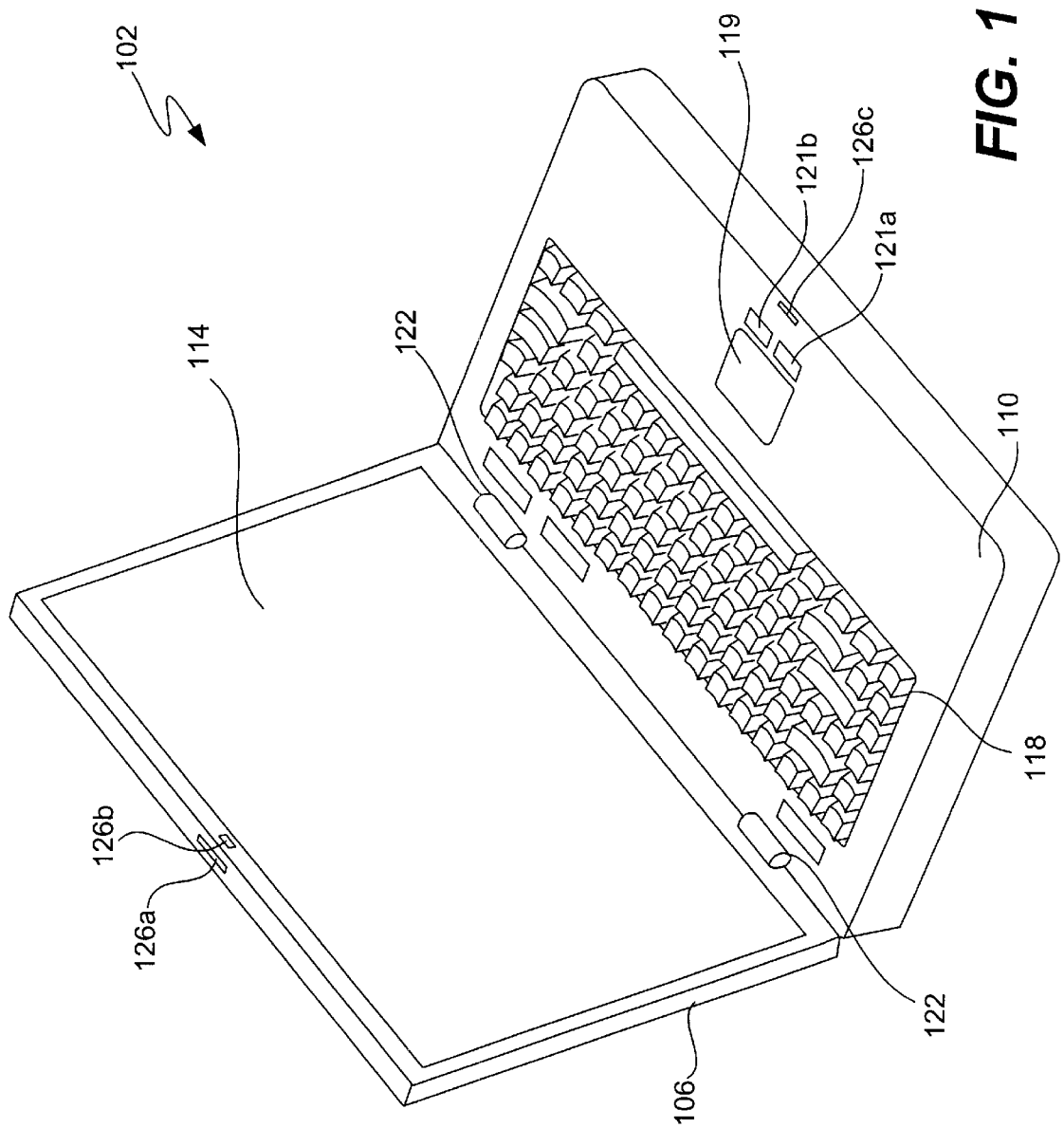
FIG. 1 is a diagrammatic representation of a notebook computer.
Figure 8A:
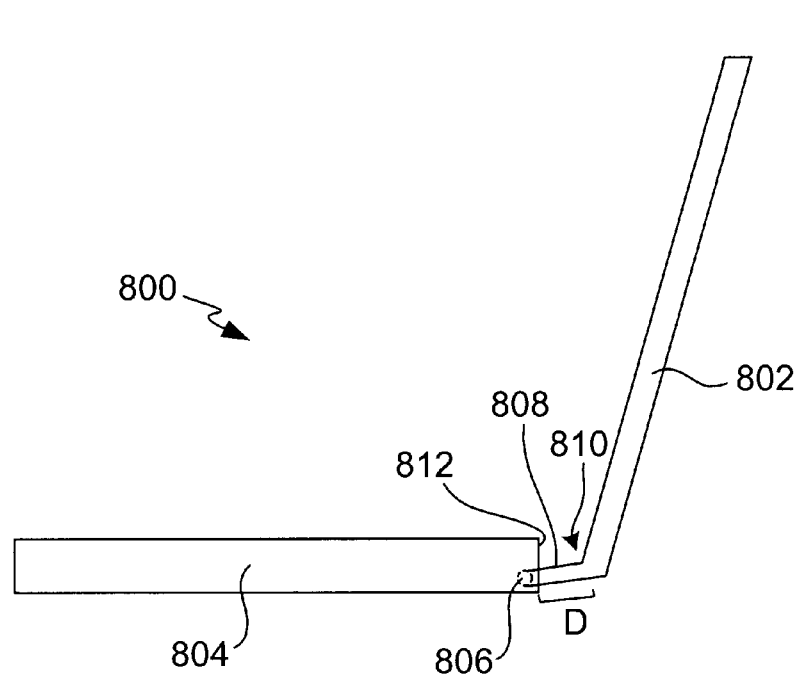
FIGS. 8a and 8b are diagrams illustrating a notebook computer having a lid connected to a base by a rotateable hinge.
Figure 8B:
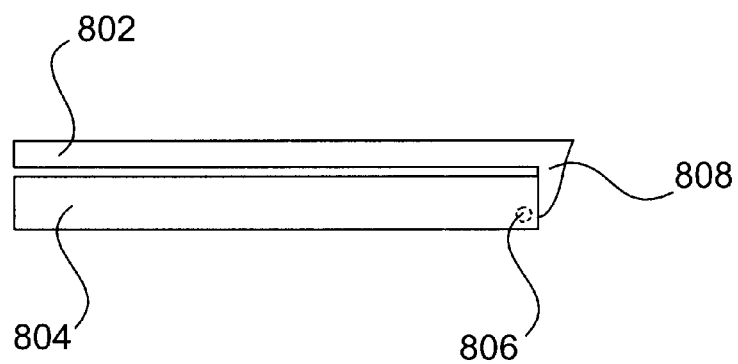

As noted above, one aspect of the invention pertains to distancing a lid (or display screen) of a notebook computer from a base of the notebook computer when in an opened position. FIG. 8a is a diagram illustrating a notebook computer 800 having a lid 802 connected to a base 804 by a rotateable hinge 806. The rotateable hinge 806 is, for example, the hinge mechanism 204 discussed above or other suitable hinges. The rotateable hinge 806 includes an extension arm 808 that extends the lid 802 back from the base 804 by a distance D when in the open position as shown in FIG. 8a. For example, when the hinge mechanism 204 of FIG. 2 and 3 is used as the rotateable hinge 806, the distance D by which the lid 802 is opened away (or set back) from the base 804 of the notebook computer 800 is determined by the length of the lid hinge assembly 210 from the hinge connection 336 to the frame 218. More particularly, when the lid 802 is in the open position, a bottom edge 810 of the lid 802 is set back a distance D from a back surface 812 of the base 804. The advantageous lid position provided by this aspect of the invention can be seen by comparing FIG. 8a with FIG. 1. Allowing a lid (or screen display) to open away from a base in this manner provides a user with a more spacious impression of the notebook computer, as the screen is set back from the base. FIG. 8b illustrates the notebook computer 800 in a closed position. As shown in FIG. 8b, the rotateable hinge 806 enables the lid 802 to rotate about the rotateable hinge 806 and the extension arm 808 is adjacent to the back surface of the base 804 in the closed position.

Further, rotateable hinge 806, or the hinge mechanism 204 discussed above, can couple to the base below the top surface of the base. For example, as shown in FIG. 8a, the rotateable hinge 806 couples to the base 804 at a position within a bottom half of the base 804. Typically, the rotateable hinge 806 is coupled to the base 804 near the center of the base 804 or lower. In general, the lower the rotateable hinge 806 is coupled to the base 804, the greater the distance D that is obtained to set back the lid 802 from the base 804 when the lid 802 is in the open position.

Although multiple of embodiments of the present invention have been described, it should be understood that the present invention may be embodied in many other specific forms without departing from the spirit or the scope of the invention. By way of example, a latching hinge mechanism has been described as being suitable for use in a notebook computing device. In general, as will be appreciated by those skilled in the art, the hinge mechanism may be used a variety of other devices as well. Such devices may include, but are not limited to, notepad computers, personal electronic organizers, and calculators.

In general, the torque associated with opening a latched hinge assembly may vary depending upon the requirements of a particular design. For example, the torque necessary to effectively unlock, or open, a locked hinge assembly may be increased if the hinge assembly is designed for use with a computing device which is intended to be transported frequently. In one embodiment, the torque associated with rotating a hinge connection over a hinge band is chosen such that the weight of a computer screen of the computing device may be supported for an angle of rotation of approximately 160 degrees. Typically, the torque is also selected to be low enough to prevent the base of the computing device from lifting off of a flat surface while the lid of the device is in the process of being opened.

The materials used to form or fabricate the various parts associated with a hinge mechanism may be widely varied. The materials which are typically chosen are strong, durable materials which may withstand a relatively high level of wear and tear. In order to minimize the weight of a hinge mechanism, many parts may be formed from plastic. By way of example, although a cam has generally been described as being fabricated from steel, if the weight of the cam is of particular concern, in one embodiment, the cam may instead be formed from a plastic material.

A portable computing apparatus typically includes more than one hinge mechanism. When a portable computing apparatus such as a notebook computer includes two hinge mechanisms, in one embodiment, both hinge mechanisms may be the latching hinge mechanisms of the present invention. It should be understood, however, that for some notebook computers that include two hinge mechanisms, only one of the hinge mechanisms may be a latching hinge mechanism. By way of example, a notebook computer with two hinge mechanisms may include only one latching hinge mechanism when the latching hinge mechanism is strong enough to lock the notebook computer by itself.

It should be appreciated that the design of the components of a latching hinge mechanism may vary without departing from the spirit or the scope of the present invention. For instance, the design of the overall cam mechanism, which includes the cam, the cam arm, the cam follower, the cam pin, and the cam spring, may vary. By way of example, the shape of the cam may be ovular. Therefore, the above-described examples or embodiments are to be considered as illustrative and not restrictive, and the invention is not to be limited to the details given herein, but may be modified within the scope of the appended claims.

What is claimed is:

1. A hinge mechanism comprising:
   a first assembly including a cam follower rotatable relative to a first rotational axis; and
   a second assembly rotationally coupled to the first assembly along a second rotational axis that is spatially separated from the first rotational axis, the second assembly including a cam arranged to cooperate with the cam follower to produce a moment about the second rotational axis to hold the second assembly in a first position relative to the first assembly, wherein the hinge mechanism rotatably couples a lid and base of a notebook computer.

2. A hinge mechanism according to claim 1 wherein the first assembly includes:
   a shaft defining the first axis;
   a cam arm coupled to the cam follower, the cam arm being rotateably coupled to the shaft; and
   a spring mechanism coupled to the cam arm, the spring mechanism being arranged to push the cam arm against the cam to produce the moment that holds the second assembly in the first position relative to the first assembly.

3. A hinge mechanism according to claim 2 wherein the first assembly includes a connection pivot defining the second axis, and wherein the second assembly includes a hinge connection, the hinge connection cooperating with the connection pivot to allow the second assembly to rotate about the second axis.

4. A hinge mechanism according to claim 3 wherein the hinge mechanism provides a latching functionality without a lock mechanism.

5. A hinge mechanism according to claim 1 wherein the cam is substantially coupled to the second assembly near the connection pivot and wherein when an angle of rotation between the first and second assemblies about the second axis is below a predetermined threshold angle, the cam and the cam follower cooperate to latch the first assembly with respect to the second assembly.

6. A hinge mechanism according to claim 5 wherein the predetermined threshold angle is approximately 10 degrees.

7. A hinge mechanism according to claim 1 wherein the first assembly is attached to the base and the second assembly is attached to the lid, and wherein the moment provides a latching action that holds the lid against the base when a first surface of the is substantially parallel to a first surface of the base.

8. A hinge mechanism according to claim 7 wherein when the first surface of the lid is substantially parallel to the first surface of the base, the notebook computer is in a substantially closed orientation, and wherein the cam and cam follower are arranged to bias the notebook computer into the substantially closed orientation when an angle associated with the hinging mechanism is less than a predetermined value.

9. A hinge mechanism according to claim 8 wherein the predetermined value is approximately 10 degrees.

10. A hinge mechanism according to claim 8 wherein when the angle associated with the hinging mechanism is greater than the predetermined value, the notebook computer is in a substantially open orientation, and wherein the hinging mechanism is arranged to frictionally maintain the lid in the substantially open orientation with respect to the base.

11. The mechanism as recited in claim 1 wherein the cam follower is axially fixed along the first axis.

12. The mechanism as recited in claim 1 wherein the second assembly is axially fixed along the second axis.

13. A hinge mechanism according to claim 1 wherein the hinge mechanism rotatably couples a lid and base of a notebook computer.

14. A computing apparatus, the computing apparatus comprising:
a first housing;
a processor contained substantially within the first housing;
a display screen; and
a first hinge mechanism arranged to rotateably couple the display screen to the first housing, the display screen being arranged to rotate with respect to the first housing, wherein the first hinge mechanism is further arranged to hold the display screen substantially against the first housing when the display screen is positioned such that a front surface of the display screen is substantially parallel to a top surface of the first housing.

15. A computing apparatus according to claim 14 further comprising:
a handle used to facilitate the transport of the computer apparatus, the handle being coupled to the first hinge mechanism.

16. A computing apparatus according to claim 15 wherein the handle is rotateably coupled to the first hinge mechanism.

17. A computing apparatus according to claim 14 further comprising a second hinge mechanism, the second hinge mechanism being arranged to cooperate with the first hinge mechanism to rotateably couple the display screen to the first housing.

18. A computing apparatus according to claim 17, wherein the second hinge mechanism is further arranged to hold the display screen substantially against the first housing when the display screen is positioned such that the front surface of the display screen is substantially parallel to the top surface of the first housing.

19. A computing apparatus according to claim 14 wherein the first hinge mechanism includes:
a first assembly attached to the first housing, the first assembly including a cam follower used to produce a cam action about a first axis; and
a second assembly attached to the display screen and rotationally coupled to the first assembly about a second axis that is spatially separated from the first axis, the second assembly including a cam arranged to cooperate with the cam follower to produce a moment about the second axis so as to effectively latch the display screen against the first housing when the cam is in a first position.

20. A computing apparatus according to claim 19 wherein the first assembly includes:
a shaft defining the first axis;
a cam arm coupled to the cam follower and rotateably coupled to the shaft; and
a spring mechanism coupled to the cam arm.

21. The device as recited in claim 14 wherein the hinge mechanism comprises:
a cam follower rotatably coupled to the first housing; and
a cam fixedly coupled to the display screen, the cam being configured to engage the cam follower when the front surface of the display screen is positioned proximate the top surface of the first housing, the cam follower being configured to exert a force on the cam to hold the display screen against the first housing when the display screen is substantially parallel to the top surface of the first housing.

22. The device as recited in claim 14 wherein the cam follower and cam are non-translatable.

23. The device as recited in claim 22 further including a cam mechanism configured to hold the lid in the closed position.

24. A computer apparatus of claim 14 wherein the computer apparatus is in a closed position when the front surface of the display screen is positioned against the top surface of the first housing, and wherein the first hinge mechanism is further arranged to hold the display screen in an open position when the front surface of the display screen is rotated away from the top surface of the first housing, the open position allowing a user to view the display screen.

25. A computing apparatus, the computing apparatus comprising:
a base;
a display screen; and
a hinge arranged to rotateably couple the display screen to the base, the display screen being arranged to rotate with respect to the base, the display screen having an open position and a closed position with respect to the base,
wherein when the display screen is in the open position, a bottom edge of the display screen is set back a distance from a back surface of the base.

26. A computing apparatus according to claim 25 wherein the distance is provided by an extension arm of the hinge.

27. computing apparatus according to claim 25 wherein the hinge rotateably couples to the base at a position within a bottom half of the base.

28. A computing apparatus as recited in claim 25 wherein the hinge is further arranged to hold the display screen substantially against the top surface of the base when the display screen is positioned such that a front surface of the display screen is substantially parallel to a top surface of the first housing.

29. The computing apparatus as recited in claim 25 wherein the display screen is horizontally set back relative to a substantially vertically positioned back surface of the base.

30. The computing apparatus as recited in claim 25 wherein the back surface is positioned opposite a front surface of a base, the front surface representing the direction to which a user would face in order to operate the computing apparatus.

31. A notebook computer, comprising:

a base containing at least a processor; and a lid containing at least a display screen, the lid being pivotably coupled to the base via a hinge assembly, the hinge assembly allowing the lid to move about a first axis between a closed position, placing the lid substantially flush with the base, and an open position, placing the lid away from the base and in a spaced apart and set back position relative to the first axis, wherein the display screen is visible to a user of the portable computer when the lid is in the open position and no longer visible to the user when the lid is in the closed position.

32. The device as recited in claim 31 wherein the cam mechanism comprises:

a cam follower rotatably coupled to the base; and a cam fixedly coupled to the lid, the cam being configured to engage the cam follower when the lid is moved proximate the closed position, the cam follower being configured to exert a force on the cam to hold the lid in the closed position.

33. A portable computer according to claim 31 wherein the hinge assembly provides a latching functionality without a lock mechanism, the latching functionality holding the lid in the closed position.

34. A portable computer according to claim 31 further comprising:

a handle used to facilitate the transport of the portable computer.

35. A portable computer according to claim 31 wherein the hinge assembly comprises:

a first assembly coupled to the base and including a cam follower rotatable relative to a second axis; and a second assembly coupled to the lid and rotationally coupled to the first assembly along the first axis, the first axis being spatially separated from the second axis, the second assembly including a cam arranged to cooperate with the cam follower to produce a moment about the first axis to hold the lid in the open and closed positions.

36. A portable computer according to claim 31 wherein the base includes a keyboard, and wherein the lid covers the keyboard when the lid is in the closed position.

37. A portable computer according to claim 31 wherein the entire lid is offset from the base when the lid is in the open position.

38. A portable computer according to claim 31 wherein the lid is placed between about 90 degrees to about 180 degrees relative to the base when the lid is rotated to the open position.

39. A portable computer according to claim 31 wherein the portable computer is a notebook computer.

40. A hinge mechanism comprising:

a first assembly including a cam follower rotatable relative to a first rotational axis; and a second assembly rotationally coupled to the first assembly along a second rotational axis that is spatially separated from the first rotational axis, the second assembly including a cam arranged to cooperate with the cam follower to produce a moment about the second rotational axis to hold the second assembly in a first position relative to the first assembly, wherein the first assembly includes a shaft defining the first axis, a cam arm coupled to the cam follower, the cam arm being rotateably coupled to the shaft, and a spring mechanism coupled to the cam arm, the spring mechanism being arranged to push the cam arm against the cam to produce the moment that holds the second assembly in the first position relative to the first assembly.

41. A hinge mechanism according to claim 40 wherein the first assembly includes a connection pivot defining the second axis, and wherein the second assembly includes a hinge connection, the hinge connection cooperating with the connection pivot to allow the second assembly to rotate about the second axis.

42. A hinge mechanism according to claim 41 wherein the hinge mechanism provides a latching functionality without a lock mechanism.

43. A hinge mechanism according to claim 40 wherein the cam is substantially coupled to the second assembly near the connection pivot and wherein when an angle of rotation between the first and second assemblies about the second axis is below a predetermined threshold angle, the cam and the cam follower cooperate to latch the first assembly with respect to the second assembly.

* * * * *